United States Patent [19]
Chang et al.

[11] Patent Number: 5,809,548
[45] Date of Patent: Sep. 15, 1998

[54] SYSTEM AND METHOD FOR ZEROING PAGES WITH CACHE LINE INVALIDATE INSTRUCTIONS IN AN LRU SYSTEM HAVING DATA CACHE WITH TIME TAGS

[75] Inventors: Joseph Yih Chang, Cedar Park; Bret Ronald Olszewski, Austin, both of Tex.

[73] Assignee: International Business Machines Corporation, Armonk, N.Y.

[21] Appl. No.: 706,053

[22] Filed: Aug. 30, 1996

[51] Int. Cl.$^6$ ........................................... G06F 12/12
[52] U.S. Cl. ........................... 711/166; 711/136; 711/144; 711/135; 711/133
[58] Field of Search .................... 711/126, 133, 711/134, 135, 136, 144, 166; 395/651

[56] References Cited

U.S. PATENT DOCUMENTS

| | | | |
|---|---|---|---|
| 4,197,580 | 4/1980 | Chang et al. | 711/144 |
| 4,442,488 | 4/1984 | Hall | 711/125 |
| 4,467,411 | 8/1984 | Fry et al. | 711/136 |
| 4,885,680 | 12/1989 | Anthony et al. | 711/144 |
| 4,972,368 | 11/1990 | O'Brien et al. | |
| 5,113,508 | 5/1992 | Groves et al. | 711/126 |
| 5,287,481 | 2/1994 | Lin . | |
| 5,367,653 | 11/1994 | Coyle et al. | |
| 5,398,325 | 3/1995 | Chang et al. | |
| 5,418,921 | 5/1995 | Cortney et al. | 711/114 |
| 5,423,019 | 6/1995 | Lin . | |
| 5,434,993 | 7/1995 | Liencres et al. | |
| 5,517,633 | 5/1996 | Ohta et al. | 711/146 |

OTHER PUBLICATIONS

M. Rosenblulm et al, "The Impact of Architectural Trends on Operating System Performance", 1995, Association for Computing Machinery, Inc., pp. 1–14.

J. Chapin et al, "Memory System Performance of UNIX on CC–NUMA Multiprocessors", SIGMETRICS, 1995, ACM 0–89791–695/0005, pp. 1–13.

J. B. Chen et al, "The Impact of Operating System Structure on Memory System Performance", SIGOPS, 1993, ACM 0–89791–632–8/93/0012, pp. 120–133.

RISC System/6000 Technology, IBM Corporation, 1990, SA23–2619,00—pp. 16–23 and pp. 44–50.

*Primary Examiner*—Tod R. Swann
*Assistant Examiner*—J. Peikari
*Attorney, Agent, or Firm*—Robert M. Carwell

[57] ABSTRACT

A check is made to determine if a copy of a cache line is currently resident in the level-one data cache of a microprocessor system. If, in response to the check, it is determined that a copy of such cache line in fact is not currently resident, the cache line is created as the least-recently used cache line. Then, for set-associative data caches, the next used of the associative set will replace the most recently zeroed line. In this way, zeroing operations can replace only one ÷ (number of associative sets) of the data cache for zeroing operations, thereby leaving the most frequently used data intact. By doing so, the data-cache is not wasted on zeroed cache lines which may be infrequently reused from the data cache, thereby significantly improving system performance. In other words the net effect is to reduce probability of data cache misses on subsequent instructions because more of the cache is thereby made available for more frequently reused data. The state of the cache is better preserved without creating performance losses exhibited by the previous technique. In a preferred embodiment, the hereinbefore described system and method is employed in systems with processors comprising substantial writeback queues and memory subsystems permitting numerous outstanding writes to be in progress, and is further employed in systems embodying cache line zero/invalidate instructions.

18 Claims, 4 Drawing Sheets

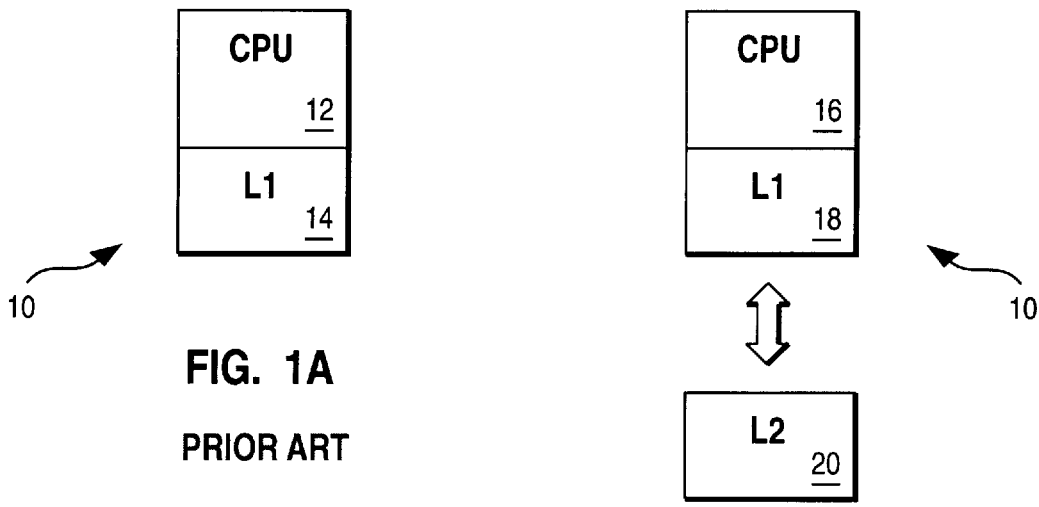
FIG. 1A
PRIOR ART
FIG. 1B
PRIOR ART
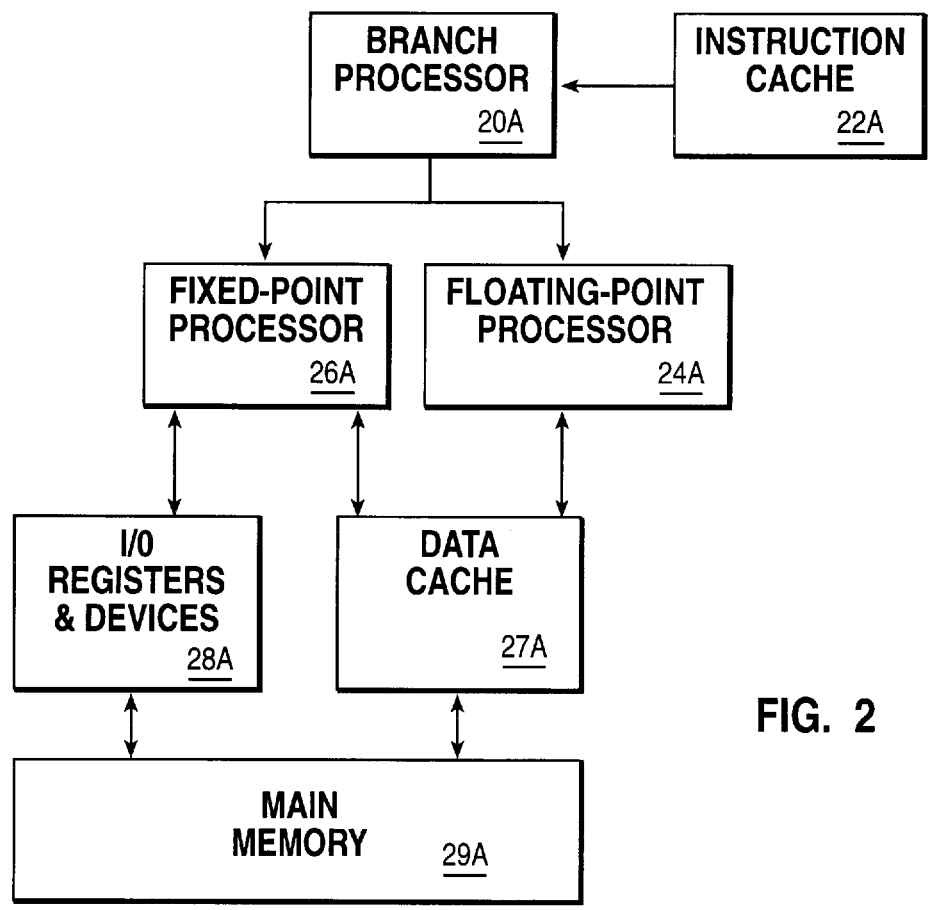
FIG. 2

CACHE STRUCTURE

DIRECTORY ENTRY

| ADDRESS | STATE (MESI) | RAS | TIME TAG | POINTER TO DATA |
|---|---|---|---|---|
| 40A | 42A | 44A | 46A | 48A |

SYSTEM AND METHOD FOR ZEROING PAGES WITH CACHE LINE INVALIDATE INSTRUCTIONS IN AN LRU SYSTEM HAVING DATA CACHE WITH TIME TAGS

TECHNICAL FIELD

The invention relates to computer operating systems in need of clearing large sections of memory, and more particularly, relates to systems and methods for zeroing pages in data cache.

BACKGROUND OF THE INVENTION

Typically in the use of operating systems in microcomputer systems a need arises to clear large sections of memory as, for example, for security purposes.

Thus, for example, when a data page is first utilized by a computer program, in a manner well known in the art the conventional practice is to zero the data page. By doing so, obviously any data which was previously residing in the page is thereby cleared, whereupon subsequent write operations to the memory occur.

A significant problem arises in such operations which seek to clear memory which may be illustrated by the following example. In a representative microprocessor system, an instruction may operate on the sequence of cache lines in a page in order to clear the cache. For a representative 4096 byte page operation on an equally typical 32 byte cache line processor, such as the model 604 PowerPC (*) processor of the IBM Corporation (* Trademark, IBM Corporation)) 128 individual cache lines must be cleared.

However, if it is assumed that a given process employs 16K bytes of data cache, then it is readily apparent that 4096/16,384 (e.g., ¼) of the cache is thereby flushed during a page zero operation. A significant problem with such a clearing operation relates to the fact that such data which is thereby zeroed may be used very sparsely if at all. This, in turn, means that most if not all of the thereby zeroed cache is wasted on zeroed cache lines which are not often used.

It has been well known in the art to provide for various forms of block operations with respect to cache, and various techniques have been devised over the years for sophisticated cache management. Representative examples of modern caching systems, and the considerations known in the art relative to good cache architecture design and management may be found in the literature including "THE IMPACT OF OPERATING SYSTEM STRUCTURE ON MEMORY SYSTEM PERFORMANCE", by Chen and Bershad, copyright 1993, ACM 0-89791-632-8/93/0012; "MEMORY SYSTEM PERFORMANCE OF UNIX ON CC-NUMA MULTIPROCESSORS", by Chapin et al, copyright 1995, ACM 0-89791-695-6/95/0005; and "THE IMPACT OF ARCHITECTURAL TRENDS ON OPERATING SYSTEM PERFORMANCE", by Rosenblum et al, copyright 1995, Association for Computing Machinery, Inc. However, there has been a paucity of research and literature available which goes beyond general discussions of block operations into zeroing operations and even the concept depicted with reference to FIG. 5 of zeroing most recently used cache locations first.

In response to the foregoing problems, which have been troubling the industry and widely studied, a representative conventional approach has been to provide a memory subsystem assist as, for example, is the case with the SPARCcenter 2000 computer system available from the Sun Corporation. However, several drawbacks are associated with providing such memory subsystem assists. For example, software support of specialized hardware function is not always available since software must detect and handle general and specialized cases.

SUMMARY OF THE INVENTION

A check is made to determine if a copy of a cache line is currently resident in the level-one data cache of a microprocessor system. If, in response to the check, it is determined that a copy of such cache line in fact is not currently resident, the cache line is created as the least-recently used cache line. Then, for set-associative data caches, the next used of the associative set will replace the previously and most recently zeroed line. In this way, zeroing operations replace a smaller fraction, e.g., 1/(number of associative sets) of the data cache for zeroing operations, thereby leaving more of the most frequently used data intact in the cache and available for cache needs.

By doing so, portions of data cache are not wasted on zeroed cache lines which may be infrequently reused from the data cache, thereby significantly improving system performance. In other words the net effect is to reduce probability of data cache misses on subsequent instructions because more of the cache is thereby made available for more frequently reused data. The state of the cache is better preserved without creating performance losses exhibited by prior techniques.

BRIEF DESCRIPTION OF THE DRAWINGS

FIG. 1 is a simplified functional block diagram of two representative microprocessor systems employing various forms of cache.

FIG. 2 is a more detailed functional block diagram of a microprocessor employing caching of FIG. 1 in which the present invention is implemented and may be advantageously employed.

DETAILED DESCRIPTION OF THE PREFERRED EMBODIMENT

Figures 3, 4:
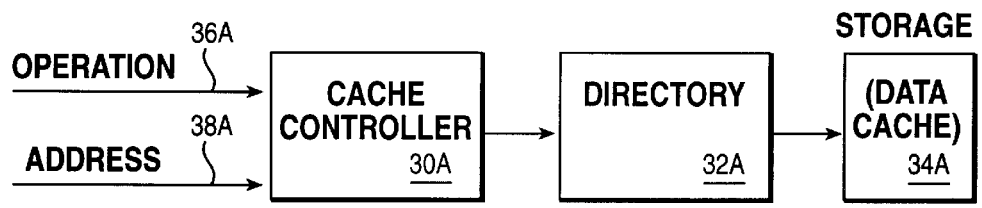
FIG. 3 is a simplified block diagram of components of the system of FIG. 2 illustrating basic components of cache and cache controller functionality.
FIG. 4 is a schematic diagram illustrating a representative entry in the cache directory of FIG. 3.

First a general description of a cached microprocessor system will be provided with reference to FIG. 1 and 2. This will be followed by a general description of the function and structure of a cache and associated cache controller and related components with reference to FIG. 3 as a significant component of the cached processor systems depicted in FIGS. 1 and 2. FIG. 4 will then be used to describe entries in the cache directory of FIG. 3.

Figure 5:
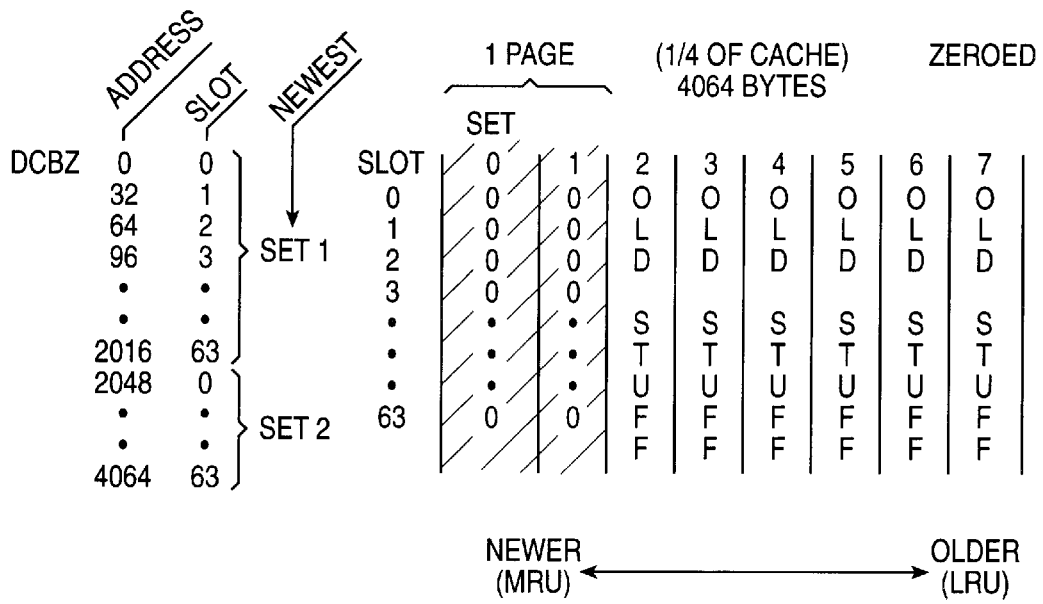
FIG. 5 is an illustration of conventional data cache operation in accordance with the prior art.

This will in turn be followed by a more detailed description of a traditional cache architecture structure illustrated by a 16K byte cache, 8-way set-associative, 32 byte line system depicted in FIG. 5. Finally, the invention will be further described with reference to a variant on FIG. 5, illustrated in FIG. 6, wherein zeroed lines are inserted in the cache as least-recently used lines in accordance with the invention.

Turning to FIG. 1, the invention is advantageously employed with a modern microprocessor system which includes some form of cache. In the embodiment under description, preferably a microcomputer system employing a PowerPC model 604 microprocessor (12,16) manufactured and distributed by the IBM Corporation is utilized. Such a system is essentially a RISC-based processor system which may operate in conjunction with a UNIX-based operating system such as the AIX operating system, also manufactured and distributed by the IBM Corporation. Whereas in such systems a particular form of cache is employed and depicted herein, it is important to note that the invention is not intended to be limited to the cache implementation of such representative systems. Rather, the invention admits to being effectively employed with numerous forms of cache, including writeback cache, unified cache, D (data) cache L1, L2 . . . $L_N$ cache and the like and is thereby not intended to be otherwise limited to the form of cache depicted herein.

Continuing with FIG. 1, in the systems 10 depicted therein, in one instance an L1 cache, 14, is shown employed with the processor 12. In another such system also shown in FIG. 1, a system is shown employing the 604 processor, 16, in conjunction with both L1 cache, 18, and L2 cache, 20, as is well known-in the art. It is sufficient to note that L1 cache is generally known as cache occurring as a part of the processor chip and is generally smaller than L2 cache.

It has long been known in the art that numerous benefits obtained by usage of supplemental cache such as cache in the form of L2 cache, 20, in FIG. 1. This L2 cache supplements the L1 cache and its function shown in the second system as L1 cache 18. L2 cache is typically larger in size than L1 cache and is typically external to the processor chip. Referring now to FIG. 2, a more detailed illustration is provided therein of a typical overall (RISC-based) microprocessor system employing a caching function in a microprocessor system in which the subject invention may be advantageously employed.

Further details regarding a representative microprocessor in which the invention may be advantageously employed may be obtained in the publication "RISC SYSTEM/6000 TECHNOLOGY", first edition, 1990, copyright IBM Corporation, with particular reference to the chapter entitled "RISC SYSTEM/6000 PROCESSOR ARCHITECTURE" and "DATA CACHE AND STORAGE CONTROL UNITS". For further details, regarding multiway associated cache memory, reference may be had to U.S. Pat. No. 5,367,653 to Coyle et al.

Continuing with FIG. 2, a representative processor architecture in which the invention is implemented is based upon a logical view of a processor consisting of three independent functional units, a branch processor, 20A, a fixed pointer processor, 26A, and a floating point processor, 24A. FIG. 2 shows the interaction of these units with instruction cache 22A and data cache 27A, as well as with main memory 29A and various I/O registers and devices 28A.

The logical function of the branch processor 20A is to process the incoming instruction stream from the instruction cache 22A, and to feed a steady flow of instructions to the fixed point and floating point processors 26A and 24A, respectively. The branch processor provides all of the branching, interrupt and condition code functions within the system.

Because the software executing on the system of FIG. 2 often knows the nature of future references, it may utilize cache instructions to improve performance and to reduce bandwidth requirements between the cache 27A and main memory 29A. For example, as will be hereinafter detailed, if the software knows that it is about to overwrite a cache line of memory, it may employ a data cache line zero (DCLZ) instruction to establish the line in the cache without causing the line to be fetched from main memory 29A. Because the cache line is also set to all zeros by this instruction, it may be used to implement a very fast zero-page function.

Referring now to FIG. 3 in greater detail, selected components of a conventional cache system previously depicted are shown. More specifically, such a representative caching system typically will include some form of cache controller 30A, a cache directory 32A, and data storage 34A in which associated cache line data is maintained. The function of a cache controller is well known in the art and will thus not be detailed herein. Essentially its purpose is to organize the efficient storage and retrieval of cache lines in the storage 34A by means of the directory 32A and in response to operation and address lines 36A, 38A, respectively. The operation lines 36A will carry various instructions from the instruction set of the microprocessor having to do with corresponding desired cache operations decoded by the cache controller 30A so as to operate upon cache data associated with corresponding addresses 38A. One such operation known in the PowerPC architecture is a "DCBZ" operation (data control block zero operation and corresponding DCBZ instruction used) for purposes of zeroing out cache lines in the data cache or storage 34A. Thus, the controller 30A will decode this particular instruction carried on line 36A and cause to be performed various other steps to be hereinafter described to effect cache management as desired.

Turning to FIG. 4, depicted therein is a schematic illustration of a typical entry in the directory 32A. It will be recalled that the directory serves the purpose of storing, with respect to each cache line, various data and parameters which are necessary to effect cache management. With respect to a given cache line, therefore, in the illustration of FIG. 5, the directory 32A will contain an address 40A associated with the particular respective cache line. It further will preferably include state information 42A associated with the particular cache line which, in the case of the PowerPC implementation, is MESI state data (e.g., whether the cache line is Modified, Exclusive, Shared, or Invalid). A next field associated with each cache line is a RAS field 44A which may contain information about parity structure, etc.

Additionally, a time tag field, 46A, is included. This is an extremely important field which contains aging information for the least recently used (LRU) cache line replacement technique of the invention to be hereinafter described in greater detail. When it is desired to alter the cache line, in response to the address on line 38A, the cache controller 30A will essentially perform a lookup into the directory 32A for the corresponding cache line information of FIG. 4 associated with the address 38A and corresponding address 40A. The directory 32A may provide 1:1 lookup capability to the desired particular cache line information stored as cache data in storage 34A. Alternatively, the particular cache line data may be located by means of indirection, e.g., an additional field 48A which is a pointer to data contained in the storage, 34A. It should be noted in passing that the importance of the field 46A in FIG. 4 is that this is the field which is essentially going to be manipulated in a manner to be hereinafter described to effect the desired insertion of zeroed lines as least-recently used, contrary to conventional teachings.

Turning now to FIG. 5, the invention may be best understood by first gaining an understanding of the conventional technique for zeroing lines in the illustrative microprocessor system depicted herein. In the illustrated system of FIG. 5, it will be assumed that the task is to zero a page. The cache geometry under consideration, it will be recalled, is a 16K cache, 8 way set-associative, with 32 byte lines. It will accordingly be readily appreciated that as shown in FIG. 5, the geometry will be comprised of 64 slots (0–63) shown in the left-most column, with each such slot having associated therewith a horizontal row comprised of a plurality of 8 sets (0–7). Shown at the lower portion of FIG. 5 is essentially a time line intended to illustrate that commencing with the zero set (the second-to-left column of FIG. 5) the sets progress from the newest to the oldest, e.g., the most-recently used (MRU) cache data to the oldest or least-recently used (LRU) cache data.

Continuing with FIG. 5, as data cache block zeroing instructions (DCBZ) are successively received and decoded by the cache controller 30A of FIG. 3, 32 byte cache lines will successively be stored or zeroed in the storage of the cache data storage 34A in consecutive numerically increasing slots. Thus, for example, as shown in FIG. 5, when a DCBZ instruction having an address zero is received, the cache line is zeroed out in slot zero, set zero. In like manner, when a DCBZ having an address 32 is received, the cache line in slot 1, set zero is zeroed out. In the general case, the slot number is determined by the address and is calculated in accordance with the
relationship slot=(address/line size)MOD (number of slots). Thus, for example, for an address of zero, line size of 32, and 64 slots, slot=(0/32)MOD (64)=0.

Similarly, for an address 2048, slot=(2048/32)MOD (64)=0.

This zeroing continues with successive DCBZ incoming instructions of increasing address size vertically down the next-to-leftmost column of FIG. 5 in set zero until a DCBZ instruction having an address 2048 is encountered. Mapping of addresses to slots will continue in accordance with the previously described address→slot relationship. Eventually the storage process loops up and over to the top of the third-to-leftmost column of FIG. 5 corresponding to set 1. The process thereafter continues, commencing with a DCBZ instruction having an address 2048 causing a data cache line zero entry in slot 0 of set one. In like manner, the process continues with increasing addresses for the successive DCBZ zeroing instructions through to the end of the page which is desired to be zeroed. This end of page will correspond to a DCBZ address of 4064, causing a cache line to be zeroed at slot 63 of set one at the bottom of the third-to-leftmost column of FIG. 5.

At the completion of the foregoing process, as shown in FIG. 5, second and third-to-leftmost two columns corresponding to sets 0 and 1 (comprising a 4064 byte page) will all contain data cache lines of zero. It will be seen that the remainder of the sets 2–7 will contain "old stuff", e.g., data which is still presumably useful to remain in the cache that preexisted prior to the zeroing operation. However, a significant fact to note in the conventional zeroing operation just described and depicted in FIG. 5 is that the zeroing has occurred and commenced in cache locations associated with the left most-recently-used area of the cache first, e.g., the column associated with set 0. Zeroing progressed to the right into the less frequently used column associated with set 1. In this manner, these zeros necessary to zero the page are taking up 2 of the available 8 sets of cache data, e.g., 2/8 or one-fourth of the available cache space. As previously described, this solution is extremely costly in that the cache space occupied by the zeroes could more beneficially be utilized by cache data with a higher probability of being utilized.

Figure 6:
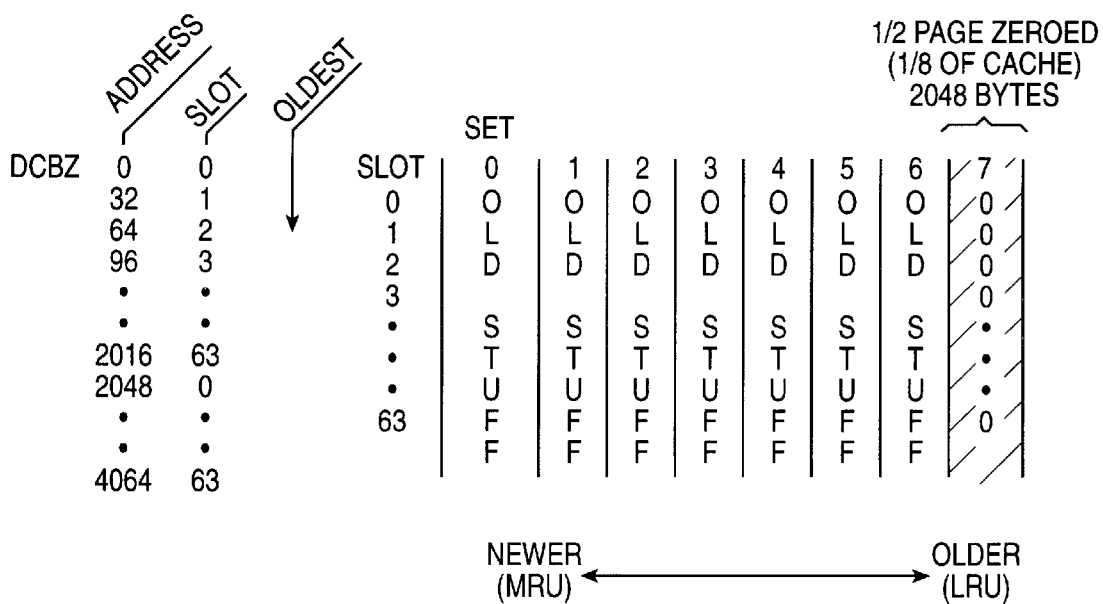
FIG. 6 is an illustration of data cache operation in accordance with the teachings of the present invention.

Referring now to FIG. 6, depicted therein is a representative example of how cache may be zeroed in accordance with the invention. A comparison with FIG. 5 reveals similarities with the previously described technique. For example, again it is assumed that a cache geometry including 16K cache, 8 way set-associative, 32 byte lines are provided. Also similar to the illustration of FIG. 5, each data control block zero instruction (DCBZ) and access will map to one of 64 slots in one of 8 sets.

However, there is a significant difference. It will be recalled that in the illustration of FIG. 5, as the process is continued of zeroing the addresses of a page, eventually the prior system resulted in two complete associative slots or columns filled with zeroes comprising fully ¼ of the available data cache. In other words address zero went in slot zero, address 32 went in slot 1, and eventually at address 2048 the process wrapped around again to slot zero of set 1 until a page comprised of the second and third-to-leftmost columns of FIG. 5 were zeroed out or filled with zeroes.

However, in accordance with the invention, rather than placing zeroes in the most recently used locations of the cache (as in the case of FIG. 5), zeroes in FIG. 6 are placed in the least recently used area first, e.g., in the right-most column of slots 0–63 of set 7. Moreover, when all of these slots are filled downward as a result of a succession of DCBZ instructions of increasing addresses, at address 2048 we, unlike the example of FIG. 5, instead of wrapping around to the first slot "zero" of the next set, this next set or column of zeroes will be caused to overlay the previous set of zeroes in the same set 7. Thus, as shown in FIG. 6, zeroes will only appear in the right-most column of the cache diagram, e.g., in a single column corresponding to set 7. The remaining columns comprised of slots 0–63 for sets 0–6 will retain the "old stuff", e.g., the preexisting data in the cache. In this manner, only ⅛ (one-eighth) of the available data cache will be taken up by zeros as contrasted, significantly, with FIG. 5 wherein ¼ (one-fourth) of the available data cache is taken up by the zeros. This difference is accounted for by the fact that in the prior art example of FIG. 5, zeroing of data cache lines occurred with respect to the most recently used locations in the cache as contrasted with the invention wherein the zeroing is of least-recently used cache locations. This results in a net of ½ page or 2048 bytes of "old" cache data which are preserved and which, in accordance with prior art techniques, would have otherwise been lost. As previously noted, the use of zeroed cache data is sparse and thus one-half of a page of additional precious "old" cache prior to the cache zeroing operation is available for frequently hit cache data. Thus in accordance with the implementation of the invention just described, only one set associative slot is employed for zeroing operations.

Figure 7:
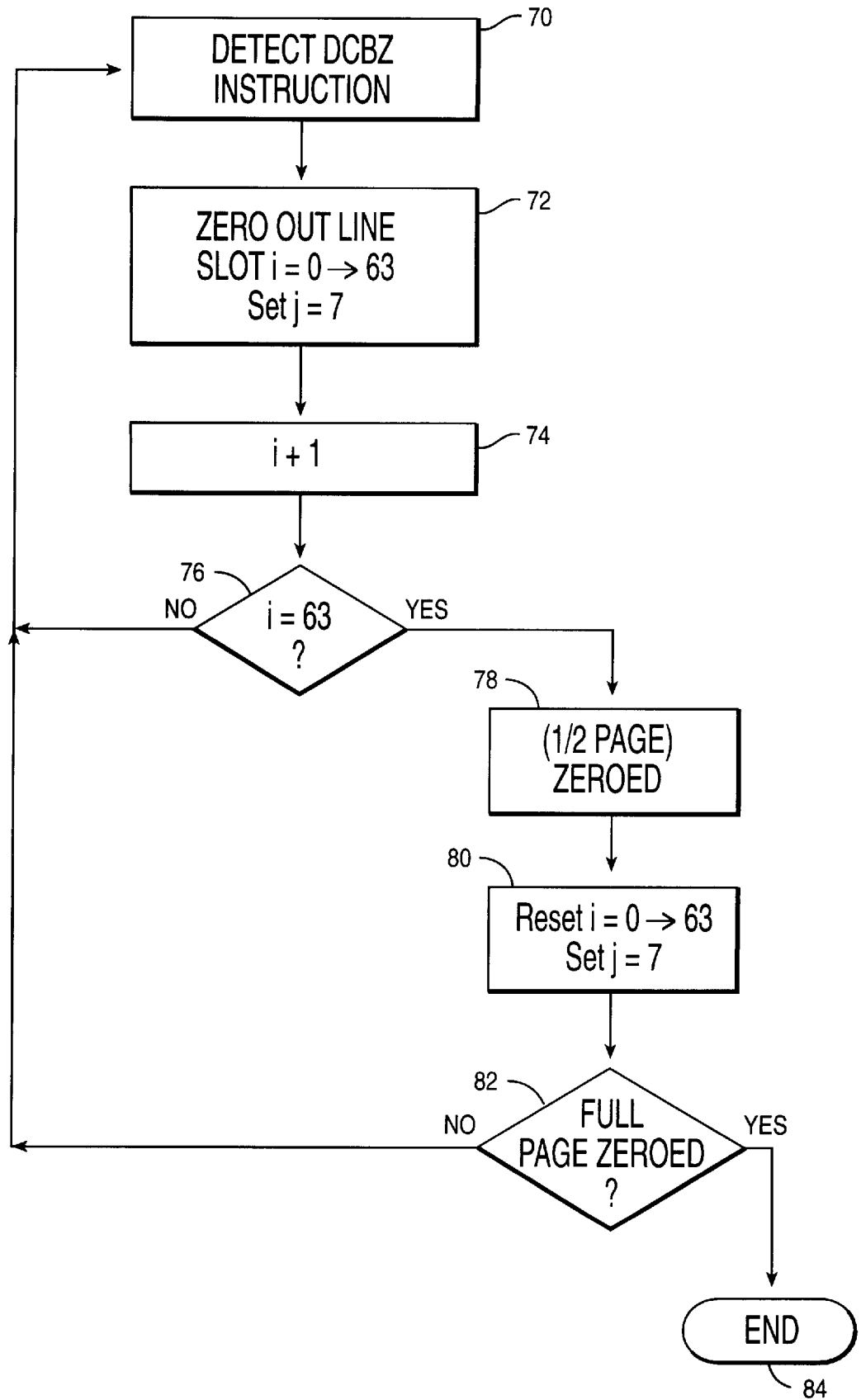
FIG. 7 is a flow diagram illustrating the sequence of caching operation steps of the invention.

The foregoing process may be graphically summarized with reference to the flow diagram of FIG. 7. This figure illustrates a representative sequence of steps to effect the zeroing of pages such as that described with the example of FIG. 6. The system of FIG. 2 will implement this flow diagram and appropriate program code to which the cache controller 30A of FIG. 3 is responsive to effect the desired zeroing. First a DCBZ instruction is detected, 70. Responsive to this, a cache line is zeroed out, 72. The slot I is initially zero and the set number is 7. After the line is zeroed, the slot I is incremented by 1, 74. A check is then made at reference numeral 76 to determine if the last slot 63 has been reached which is a function of the previously described address→slot mapping. If not, the process loops back to block 70 to await detection of a next DCBZ instruction.

When it is detected, the next line is zeroed out but this time at the incremented slot number 1 for the same set number 7. The slot number is then incremented again, 76, and the test made of whether the last slot has been zeroed, 76. When the slot has been zeroed, this indicates a half page has been zeroed, 78. The slot number is then reset to I=0, shown at reference numeral 80. However, the important point is that the set number remains the same, e.g., 7. A test is made of whether a full page has been zeroed yet, 82. If not, the process loops back to block 70. A next DCBZ instruction is-awaited. The slot number is incremented, 72. When the 63rd slot has been filled in this second pass through the process, 76, the process falls out through the rightmost path of block 76 and a check is made of whether the full page has been zeroed, 82. When this has been detected, the process ends at block 84.

The foregoing is intended only as a simplified example to illustrate the concept that sequential DCBZ instructions will zero a succession of address line caches in corresponding slots. However, it will be readily apparent that the invention admits to a number of different techniques which essentially amount to a mapping of address locations to appropriate slots.

Several additional points must be made. First, although only one form of cache architecture has been depicted, the invention is not intended to be so limited. The particular implementation of the invention depends obviously upon precisely how the cache is implemented and for example, whether a data cache block zero instruction is implemented in the processor instruction although, again, the invention is not intended to be limited only to such cases.

However, in the case of the implementation under consideration, as previously noted, the cache controller 30A of FIG. 3 will identify the incoming DCBZ instruction occurrence, e.g., the cache controller will identify that an operation specified on the operation line 36A is a data cache block zero operation. Accordingly, in the replacement process wherein a new cache line is to be added (e.g., the prior one zeroed out or replaced with a zero), the controller will preferably mark the new line with a time tag (field 46A of FIG. 4) as being the oldest. However, in an alternate embodiment, it is important to note that the same objective of the invention could be achieved by not so altering a time tag. For example, in some instances the time tag may not need be changed since the cache line that was elected to be replaced may already be the oldest line. Rather, then, instead of updating such a time tag field, it could remain as the "old" time and thereby automatically become the oldest entry. However, in the implementation described, the cache controller 30A in fact will preferably have control over how such time tags 46A get set in the directory 32A.

It also should be readily apparent that the invention may be applicable to relatively large L2 caches wherein numerous sequential zeroing operations may be anticipated. Even in such instances wherein a zeroed page might comprise a smaller portion of the total available cache size than in other instances, the benefits of the invention might nevertheless become significant for a given frequency of such zeroing operations in a row.

From the foregoing it should be readily apparent that the invention is applicable to differing cache geometries and in some cases may be even more beneficial given the geometry than in the illustration. For example, machines are known in the art that have relatively larger page sizes on the order of 8K bytes or the like which can take up an even more significant portion of available data cache. In such instances, the benefits of the invention may obviously become even-more significant.

Still further, as noted, a particular implementation of the invention may depend upon how the cache implements the data zeroing, as for example in the case of the described implementation employing a data cache block zero (DCBZ) instruction. It will be noted that different instantiations may be possible on the bus associated with the system. For example, if the system in which the invention is employed includes an L2 cache, there may be a "DCLAIM" operation which may be used on some microprocessor buses which might differ slightly from an instantiation on a bus associated with a different microprocessor family.

From the foregoing it will be apparent that in a broad sense the invention contemplates instantiation or insertion of zeroed cache lines as the least recently used lines in the cache. In the implementation described, there is actually a dedicated instruction, e.g., the DCBZ instruction, comprising a member of the processor instruction set which is particularly adapted to effecting this goal. However, in an even broader sense, it is contemplated that implementations incorporating the teachings of the invention may be desirable wherein the cache controller would be sufficiently sophisticated to determine that a portion of cache had been filled with zeroes even without detecting a DCBZ instruction or operation. In such instances, the concept of zeroing least recently used portions of the cache in accordance with the invention would nevertheless desirably still be effected without departing from the spirit and scope of the invention.

While the invention has been shown and described with reference to particular embodiments thereof, it will be understood by those skilled in the art that the foregoing and other changes in form and detail may be made therein without departing from the spirit and scope of the invention.

We claim:

1. A method for zeroing cache lines in a microprocessor system cache having an architecture including lines ranging from most recently used (MRU) to least recently used (LRU) positions, comprising:

detecting requirement for said zeroing cache lines; and zeroing at least one of said cache lines starting with said LRU position; and wherein each of said at least one cache lines includes a corresponding cache directory entry having a time tag field; and wherein said method further includes:

altering said time tag in said field to be set to said LRU position.

2. The method of claim 1 wherein said detecting comprises:

detecting occurrence of a data cache block zero (DCBZ) instruction.

3. The method of claim 1 wherein said architecture of said cache is set-associative.

4. The method of claim 1 wherein said zeroing at least one of said cache lines comprises:

zeroing a first plurality of said at least one of said cache lines in a corresponding plurality of slots of a set representing LRU ones of said cache lines.

5. The method of claim 4 wherein said zeroing at least one of said cache lines further comprises:

zeroing a second plurality of said at least one of said cache lines in said corresponding plurality of slots of said set representing LRU ones of said cache lines.

6. The method of claim 5 wherein said cache is a data cache.

7. The method of claim 5 wherein said cache is selected from a cache set comprising unified data, or $L_N$ cache.

8. The method of claim 5 wherein said architecture is N-way set-associative, and wherein said set representing LRU ones of said cache lines is the Nth set.

9. The method of claim 5 wherein said zeroing of said first and said second plurality corresponds to the last LRU associative set of said cache.

10. Apparatus for zeroing cache lines in a microprocessor system cache having an architecture including lines ranging from most recently used (MRU) to least recently used (LRU) positions, comprising:

means for detecting requirement for said zeroing cache lines;

means for zeroing at least one of said cache lines starting with said LRU position; and means for storing each of said at least one cache lines including cache directory means for storing a corresponding cache directory entry having a time tag field; and wherein said apparatus further includes:

means for altering said time tag in said field to be set to said LRU position.

11. The apparatus of claim 10 wherein said means for detecting comprises:

means for detecting occurrence of a data cache block zero (DCBZ) instruction.

12. The apparatus of claim 10 wherein said architecture of said cache is set-associative.

13. The apparatus of claim 10 wherein said means for zeroing at least one of said cache lines comprises:

means for zeroing a first plurality of said at least one of said cache lines in a corresponding plurality of slots of a set representing LRU ones of said cache lines.

14. The apparatus of claim 13 wherein said zeroing at least one of said cach lines further comprises:

means for zeroing a second plurality of said at least one of said cache lines in said corresponding plurality of slots of said set representing LRU ones of said cache lines.

15. The apparatus of claim 14 wherein said cache is a data cache.

16. The apparatus of claim 14 wherein said cache is selected from a cache set comprising unified data, or $L_N$ cache.

17. The apparatus of claim 14 wherein said architecture is N-way set-associative, and wherein said set representing LRU ones of said cache lines is the Nth set.

18. The apparatus of claim 14 wherein said means for zeroing of said first and second plurality zero cache lines in locations corresponding to the last LRU associative set of said cache.

* * * * *